(12) United States Patent
Hung et al.

(10) Patent No.: US 11,036,952 B2
(45) Date of Patent: *Jun. 15, 2021

(54) TOUCH APPARATUS AND TOUCH DETECTION INTEGRATED CIRCUIT THEREOF

(71) Applicant: Novatek Microelectronics Corp., Hsinchu (TW)

(72) Inventors: Ching-Ho Hung, Hsinchu (TW); Jiun-Jie Tsai, Hsinchu County (TW); Ting-Hsuan Hung, Hsinchu (TW); Wei-Lun Shih, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/677,605

(22) Filed: Nov. 7, 2019

(65) Prior Publication Data

US 2020/0134285 A1 Apr. 30, 2020

Related U.S. Application Data

(63) Continuation-in-part of application No. 15/378,025, filed on Dec. 13, 2016, now Pat. No. 10,503,308.
(Continued)

(51) Int. Cl.
G06F 3/041 (2006.01)
G06K 9/00 (2006.01)
G06F 3/05 (2006.01)

(52) U.S. Cl.
CPC ....... G06K 9/00013 (2013.01); G06F 3/0416 (2013.01); G06F 3/05 (2013.01)

(58) Field of Classification Search
CPC ................ G06F 3/0416; G06F 3/044; G06F 2203/04106; G06K 9/00013; G06K 9/00087
See application file for complete search history.

(56) References Cited

U.S. PATENT DOCUMENTS 6,246,395 B1 * 6/2001 Goyins ................ G06F 3/0488
345/173
8,487,905 B2 7/2013 Kandziora et al.
(Continued)

FOREIGN PATENT DOCUMENTS

CN 101765825 6/2010
CN 104834426 8/2015
(Continued)

OTHER PUBLICATIONS

"Office Action of China Counterpart Application", dated Nov. 26, 2020, p. 1-p. 9.

Primary Examiner — Towfiq Elahi
(74) Attorney, Agent, or Firm — JCIPRNET

(57) ABSTRACT

A touch apparatus and a touch detection integrated circuit (IC) thereof are provided. The touch detection IC includes a driving signal generation circuit and a receiving circuit. The driving signal generation circuit is configured to control a touch panel to perform touch sensing operation and control a fingerprint sensor to perform fingerprint sensing operation. The receiving circuit receives and processes a touch signal of the touch panel during a first period when the driving signal generation circuit transmits the first driving signal for controlling the touch panel to perform touch sensing operation. The receiving circuit receives and processes a fingerprint signal of the fingerprint sensor during a second period when the driving signal generation circuit transmits the second driving signal for controlling the fingerprint sensor to perform fingerprint sensing operation.

39 Claims, 8 Drawing Sheets

Related U.S. Application Data

(60) Provisional application No. 62/889,572, filed on Aug. 21, 2019, provisional application No. 62/831,718, filed on Apr. 9, 2019, provisional application No. 62/881,912, filed on Aug. 1, 2019.

(56) References Cited

U.S. PATENT DOCUMENTS

| | | |
|---|---|---|
| 10,013,594 B2 | 7/2018 | Liu et al. |
| 2009/0027353 A1 | 1/2009 | Im et al. |
| 2012/0081328 A1 | 4/2012 | Kandziora et al. |
| 2016/0148034 A1 | 5/2016 | Kremin et al. |
| 2017/0161537 A1 | 6/2017 | Liu et al. |
| 2018/0035923 A1* | 2/2018 | Kang ............... A61B 5/117 |
| 2018/0260600 A1* | 9/2018 | Kremin ............ G06K 9/001 |

FOREIGN PATENT DOCUMENTS

| | | |
|---|---|---|
| CN | 105373269 | 3/2016 |
| CN | 105975947 | 9/2016 |
| TW | 201108084 | 3/2011 |

\* cited by examiner

TOUCH APPARATUS AND TOUCH DETECTION INTEGRATED CIRCUIT THEREOF

CROSS-REFERENCE TO RELATED APPLICATION

This application is a continuation-in-part application of and claims the priority benefit of a prior application Ser. No. 15/378,025, filed on Dec. 13, 2016. This application also claims the priority benefit of U.S. provisional application Ser. Nos. 62/889,572, 62/831,718 and 62/881,912 filed on Aug. 21, 2019, Apr. 9, 2019 and Aug. 1, 2019. The entirety of the above-mentioned patent application is hereby incorporated by reference herein and made a part of this specification.

BACKGROUND

Field of the Invention

The invention is directed to an integrated circuit (IC). More particularly, the invention is directed to a touch apparatus and a touch detection IC thereof.

Description of Related Art

Along with progress of technologies, the convenience and applicability of electronic apparatuses are progressively developed. An electronic apparatus is commonly equipped with a touch panel and other sensors (e.g., a fingerprint sensor). The touch panel and the fingerprint sensor pertains to two different modules. In a conventional circuit design of the electronic apparatus, the touch panel is controlled by a driving integrated circuit (IC) (i.e., a touch detection IC dedicated to the touch panel), and the fingerprint sensor is another IC (i.e., fingerprint sensor IC dedicated to acquire the fingerprint).

SUMMARY

The invention is directed to a touch apparatus and a touch detection integrated circuit (IC) thereof, in which a touch panel and a fingerprint sensor are driven/controlled by the same IC.

According to an embodiment of the invention, a touch detection IC is provided. The touch detection IC is configured to drive a touch panel to receive one or more touch signals of the touch panel and drive a fingerprint sensor to receive one or more fingerprint signals of the fingerprint sensor. The touch detection IC includes a driving signal generation circuit and one or more receiving circuits. The driving signal generation circuit is configured to control the touch panel to perform touch sensing operation and control the fingerprint sensor to perform fingerprint sensing operation. The receiving circuits receive and process the touch signals of the touch panel during a first period. The receiving circuits receive and process the fingerprint signals of the fingerprint sensor during a second period.

According to an embodiment of the invention, the receiving circuit comprises a multiplexer, an analog front-end (AFE) circuit and an analog-to-digital converter (ADC). The first input terminal of the multiplexer is coupled to the touch panel. The second input terminal of the multiplexer is coupled to the fingerprint sensor. The multiplexer is configured to select to transmit one of the touch signal and fingerprint signal to an output terminal of the multiplexer. The input terminal of the AFE circuit is coupled to the output terminal of the multiplexer. The input terminal of the ADC is coupled to an output terminal of the AFE circuit. If the multiplexer selects to transmit the touch signal to the output terminal of the multiplexer, the ADC receives the touch signal through the AFE circuit and converts the touch signal into digital data. If the multiplexer selects to transmit the fingerprint signal to the output terminal of the multiplexer, the ADC receives the fingerprint signal through the AFE circuit and converts the fingerprint signal into digital data.

According to an embodiment of the invention, a touch apparatus is provided. The touch apparatus includes a system processor, a touch panel, a fingerprint sensor and a touch detection IC. In some embodiments, the system processor comprises an application processor outside the touch detection IC. In some other embodiments, the system processor comprises a processor with the touch detection IC. The touch detection IC can be coupled to the system processor through an interface. The touch detection IC is further coupled to the touch panel. The touch detection IC is configured to drive the touch panel to receive one or more touch signals of the touch panel and drive the fingerprint sensor to receive one or more fingerprint signals of the fingerprint sensor. The touch detection IC includes a driving signal generation circuit and at least one receiving circuit. The driving signal generation circuit is configured to control the touch panel to perform touch sensing operation and control the fingerprint sensor to perform fingerprint sensing operation. The receiving circuit receives and processes the touch signals of the touch panel during a first period. The receiving circuit receives and processes the fingerprint signals of the fingerprint sensor during a second period.

According to an embodiment of the invention, the receiving circuit comprises multiplexer, an analog front-end (AFE) circuit, and an analog-to-digital converter (ADC). The first input terminal of the multiplexer is coupled to the touch panel. The second input terminal of the multiplexer is coupled to the fingerprint sensor. The multiplexer is configured to select to transmit one of the touch signal and the fingerprint signal to an output terminal of the multiplexer. The input terminal of the AFE circuit is coupled to the output terminal of the multiplexer. The input terminal of the ADC is coupled to an output terminal of the AFE circuit. If the multiplexer selects to transmit the touch signal to the output terminal of the multiplexer, the ADC receives the touch signal through the AFE circuit and converts the touch signal into digital data. If the multiplexer selects to transmit the fingerprint signal to the output terminal of the multiplexer, the ADC receives the fingerprint signal through the AFE circuit and converts the fingerprint signal into digital data.

According to an embodiment of the invention, an integrated circuit is provided. The integrated circuit is configured to drive a touch panel to receive at least one touch signal of the touch panel and drive a fingerprint sensor to receive at least one fingerprint signal of the fingerprint sensor. The integrated circuit includes a driving signal generation circuit and at least one receiving circuit. The driving signal generation circuit is configured to control the touch panel to perform touch sensing operation and control the fingerprint sensor to perform fingerprint sensing operation. The receiving circuit is configured to receive and process the touch signal of the touch panel during a first period, and receive and process the fingerprint signal of the fingerprint sensor during a second period. The receiving circuit includes a multiplexer and an analog signal processing circuit. The first input terminal of the multiplexer is coupled to the touch panel. The second input terminal of the multiplexer is coupled to the fingerprint sensor. The multiplexer is configured to select to transmit one of the touch signal and the fingerprint signal to a same output terminal of the multiplexer. The input terminal of the analog signal processing circuit is coupled to the same output terminal of the multiplexer to receive the one of the touch signal and the fingerprint signal transmitted from the same output terminal of the multiplexer. The analog signal processing circuit is configured to generate a processed signal according to the one of the touch signal and the fingerprint signal transmitted from the same output terminal of the multiplexer.

According to an embodiment of the invention, a touch apparatus is provided. The touch apparatus includes a touch panel, a fingerprint sensor, a driving signal generation circuit and at least one receiving circuit. In some embodiments, the driving signal generation circuit is configured to control the touch panel to perform touch sensing operation and control the fingerprint sensor to perform fingerprint sensing operation. The at least one receiving circuit is configured to receive and process a touch signal of the touch panel during a first period, and receive and process a fingerprint signal of the fingerprint sensor during a second period. The receiving circuit comprises a multiplexer and an analog signal processing circuit. The first input terminal of the multiplexer is coupled to the touch panel, and the second input terminal of the multiplexer is coupled to the fingerprint sensor. The multiplexer is configured to select to transmit one of the touch signal and the fingerprint signal to a same output terminal of the multiplexer. The input terminal of the analog signal processing circuit is coupled to the same output terminal of the multiplexer to receive the one of the touch signal and the fingerprint signal transmitted from the same output terminal of the multiplexer. The analog signal processing circuit is configured to generate a processed signal according to the one of the touch signal and the fingerprint signal transmitted from the same output terminal of the multiplexer.

To sum up, in the touch apparatus and the touch detection IC thereof provided by the embodiments of the invention, the driving signal generation circuit and the receiving circuit are deployed. The driving signal generation circuit and the receiving circuit can jointly perform a touch sensing operation of the touch panel and jointly perform a fingerprint sensing operation of the fingerprint sensor. Thereby, the same touch detection IC can be used for driving/controlling not only the touch panel, but also the fingerprint sensor. Thus, the touch detection IC can effectively save system cost of the touch apparatus.

To make the above features and advantages of the invention more comprehensible, embodiments accompanied with drawings are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
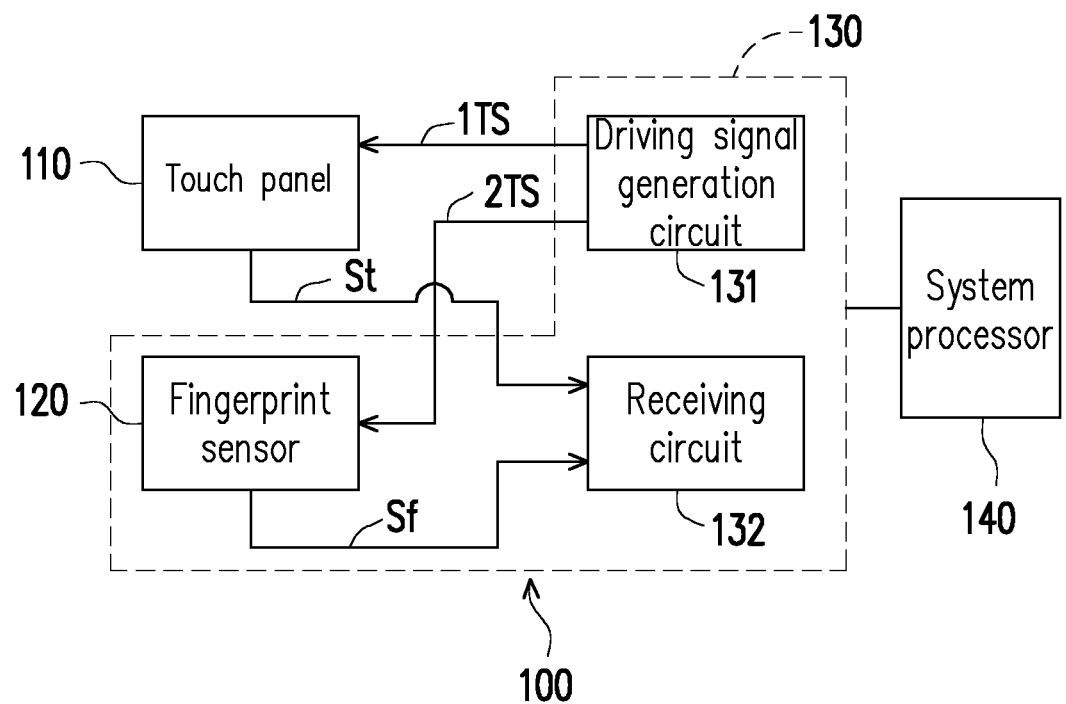
FIG. 1 is a schematic circuit block diagram illustrating a touch apparatus according to an embodiment of the invention.

The term "couple (or connect)" herein (including the claims) are used broadly and encompass direct and indirect connection or coupling means. For example, if the disclosure describes a first apparatus being coupled (or connected) to a second apparatus, then it should be interpreted that the first apparatus can be directly connected to the second apparatus, or the first apparatus can be indirectly connected to the second apparatus through other devices or by a certain coupling means. Moreover, elements/components/steps with same reference numerals represent same or similar parts in the drawings and embodiments. Elements/components/notations with the same reference numerals in different embodiments may be referenced to the related description.

FIG. 1 is a schematic circuit block diagram illustrating a touch apparatus 100 according to an embodiment of the invention. In the embodiment illustrated in FIG. 1, the touch apparatus 100 includes a touch panel 110, a touch detection integrated circuit (IC) 130 and a system processor 140. The system processor 140 is coupled to the touch detection IC 130 through an interface. Based on a design requirement, the interface may be a general purpose input/output (GPIO) interface circuit, inter integrated circuit (I²C) interface circuit, serial peripheral interface (SPI) interface circuit or any other interface circuit. The system processor 140 may be a central processing unit (CPU), a digital signal processor (DSP) or any other processing circuit (or control circuit).

In some embodiments, the touch detection IC 130 further includes a fingerprint sensor 120 and coupled to the touch panel 110. Based on a design requirement, in another embodiment, the fingerprint sensor 120 may be disposed outside of the touch detection IC 130. For example, the fingerprint sensor 120 can be placed beside the touch panel 110. Alternatively, the fingerprint sensor 120 can be placed under the touch panel 110. Based on a design requirement, in another embodiment, the touch panel 110 is a touch display panel. The touch display panel, for example, may be a touch LCD (liquid-crystal display) panel or a touch LED (Light-Emitting Diode) panel such as a touch OLED (Organic Light-Emitting Diode) panel. In some embodiments, the fingerprint sensor 120 is embedded in the touch display panel. In one embodiment, the touch panel 110, the fingerprint sensor 120, and a display panel can be integrated into one same panel. In other words, the fingerprint sensor can be arranged to be one of an on-display configuration, an-underdisplay configuration, a local in-display configuration and a global in-display configuration. According to design requirements, a fingerprint sensing region may be a whole region or a partial region of the display region. The fingerprint sensor can be any types of fingerprint sensor such as an optical fingerprint sensor or capacitive fingerprint sensor or ultrasonic fingerprint sensor.

In the embodiment illustrated in FIG. 1, the touch detection IC 130 is configured to drive the touch panel 110 to receive one or more touch signals St of the touch panel 110. The touch detection IC 130 is also configured to drive the fingerprint sensor 120 (either inside or outside the touch detection IC 130) to receive one or more fingerprint signals Sf of the fingerprint sensor 120.

Furthermore, the touch detection IC 130 includes a driving signal generation circuit 131 and a receiving circuit 132. The driving signal generation circuit 131 is configured to transmit one or more first driving signals 1TS to the touch panel 110 and transmit one or more second driving signals 2TS to the fingerprint sensor 120. The receiving circuit 132 may receive and process the touch signals St of the touch panel 110 during a first period. The receiving circuit 132 may receive and process the fingerprint signals Sf of the fingerprint sensor 120 during a second period. In some embodiment, the driving signal generation circuit 131 outputs the first driving signals 1TS to the touch panel 110 during the first period, and the driving signal generation circuit 131 outputs the second driving signals 2TS to the fingerprint sensor 120 to perform fingerprint sensing operation during the second period. It is noted that the touch panel may directly use the first driving signal for performing touch sensing operation or include at least one conversion circuit such as at least one gate driver on array (GOA) for converting the first driving signals into signals appropriate for perform touch sensing operation. Similarly, the fingerprint sensor may directly use the second driving signal for performing fingerprint sensing operation or include at least one conversion circuit such as at least one gate driver on array (GOA) for converting the second driving signals into signals appropriate for perform fingerprint sensing operation.

According to the above description, the touch detection IC 130 illustrated in FIG. 1 provides the one or more first driving signals 1TS and the one or more second driving signals 2TS by using the driving signal generation circuit 131 to respectively drive the touch panel 110 and the fingerprint sensor 120. The receiving circuit 132 receives and processes the touch signals St generated by the touch panel 110 according to a drive timing of the driving signal generation circuit 131. In the same way, the receiving circuit 132 may also receive and process the fingerprint signals Sf generated by the fingerprint sensor 120 according to the drive timing of the driving signal generation circuit 131. With the use of the touch detection IC 130, not only the touch panel 110 but also the fingerprint sensor 120 can be driven/controlled. Thus, the touch detection IC can effectively save system cost of the touch apparatus 100.

Figure 2:
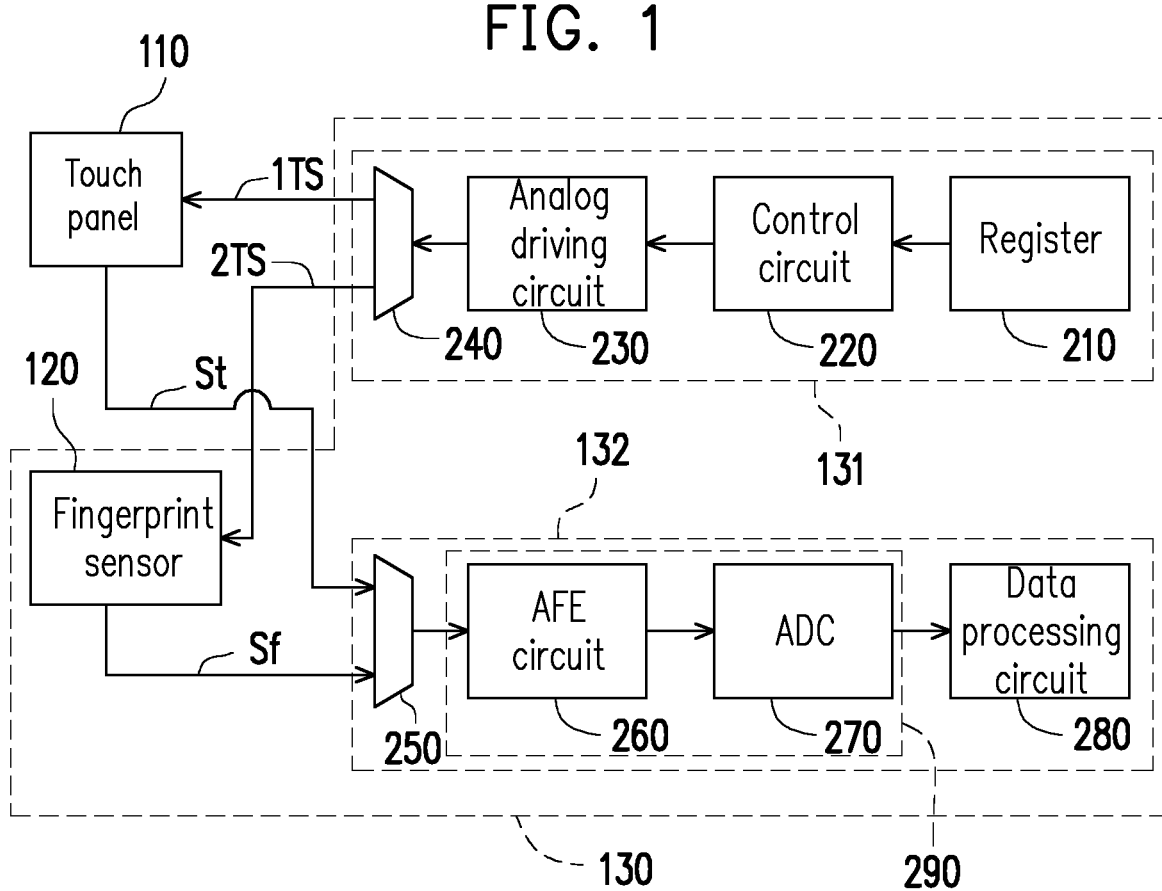
FIG. 2 is a schematic circuit block diagram illustrating the driving signal generation circuit and the receiving circuit depicted in FIG. 1 according to an embodiment of the invention.

FIG. 2 is a schematic circuit block diagram illustrating the driving signal generation circuit 131 and the receiving circuit 132 depicted in FIG. 1 according to an embodiment of the invention. In the embodiment illustrated in FIG. 2, the driving signal generation circuit 131 includes a register 210, a control circuit 220, an analog driving circuit 230 and a demultiplexer 240. The register 210 is configured to store first driving waveform data and second driving waveform data from the system processor 140. The system processor 140 may set the one or more first driving waveform data to determine the waveforms and/or frequencies of the first driving signals 1TS and set the one or more second driving waveform data to determine the waveforms and/or frequencies of the second driving signals 2TS.

Furthermore, the output terminals of the control circuit 220 are coupled to the input terminals of the analog driving circuit 230. The input terminals of the control circuit 220 are coupled to the register 210 to read the first driving waveform data and/or the second driving waveform data. During the first period, the control circuit 220 controls the analog driving circuit 230 according to the first driving waveform data to generate the corresponding first driving signals 1TS. During the second period, the control circuit 220 controls the analog driving circuit 230 according to the second driving waveform data to generate the corresponding second driving signals 2TS. The input terminals of the demultiplexer 240 are coupled to the output terminals of the analog driving circuit 230. The first output terminals of the demultiplexer 240 are coupled to the touch panel 110. The second output terminals of the demultiplexer 240 are coupled to the fingerprint sensor 120. During the first period, the demultiplexer 240 selects to transmit the one or more first driving signals 1TS generated by the analog driving circuit 230 to the touch panel 110. During the second period, the demultiplexer 240 selects to transmit the one or more second driving signals 2TS generated by the analog driving circuit 230 to the fingerprint sensor 120.

The touch panel 110 may be a capacitive touch panel, e.g., a conventional touch panel or a touch panel of any other type. The fingerprint sensor 120 may be a capacitive fingerprint sensor, e.g., a conventional fingerprint sensor or a fingerprint sensor of any other type. The touch panel 110 and the fingerprint sensor 120 may be different devices separated from each other. Based on a design requirement, in some embodiments, the touch detection IC 130 and the fingerprint sensor 120 may be disposed in the same chip. In some other embodiments, the touch detection IC 130 and the fingerprint sensor 120 may be different chips, but disposed in the same package. Based on a design requirement, in some embodiments, the touch detection IC 130 may be disposed on a flexible circuit board (not shown) and thereby, may be electrically connected to the touch panel 110 through the flexible circuit.

The implementation manner of the analog driving circuit 230 is not limited in the invention. For example, the analog driving circuit 230 may be one or more digital-to-analog converters configured to convert digital waveform data of the control circuit 220 into analog driving signals. In some embodiments, the analog driving circuit 230 may be one or more conventional driving signal generation circuits and thus, will not be repeatedly described. During the first period, the analog driving circuit 230 transmits the one or more first driving signals 1TS to one or more driving electrodes of the touch panel 110 through the demultiplexer 240, and the receiving circuit 132 synchronously receives/detects the touch signals St of one or more sensing electrodes of the touch panel 110. During the second period, the analog driving circuit 230 transmits the one or more second driving signals 2TS to one or more driving electrodes of the fingerprint sensor 120 through the demultiplexer 240, and the receiving circuit 132 synchronously receives/detects the one or more fingerprint signals Sf of one or more sensing electrodes of the fingerprint sensor 120.

In the embodiment illustrated in FIG. 2, the receiving circuit 132 includes a multiplexer 250, an analog signal processing circuit 290 and a data processing circuit 280. The first input terminals of the multiplexer 250 are coupled to the sensing electrodes (touch sensing lines) of the touch panel 110 to receive the touch signals St. The second input terminals of the multiplexer 250 are coupled to the sensing electrodes (fingerprint sensing lines) of the fingerprint sensor 120 to receive the fingerprint signals Sf. The input terminal of the analog signal processing circuit 290 is coupled to the same output terminal of the multiplexer 250 to receive the one of the touch signal St and the fingerprint signal Sf transmitted from the same output terminal of the multiplexer 250. The analog signal processing circuit 290 is configured to generate a processed signal according to the one of the touch signal St and the fingerprint signal Sf transmitted from the same output terminal of the multiplexer 250.

In the embodiment illustrated in FIG. 2, the analog signal processing circuit 290 includes a set of analog front end (AFE) circuit 260 and an analog-to-digital converter (ADC) 270. The output terminals of the multiplexer 250 are coupled to the input terminals of the AFE circuit 260. During the period of the one or more first driving signals 1TS being outputted to the touch panel 110 (i.e., the first period), the multiplexer 250 selects to transmit the touch signals St of the touch panel 110 to the input terminals of the AFE circuit 260 through the output terminals of the multiplexer 250. During the period of the second driving signals 2TS being outputted to the fingerprint sensor 120 (i.e., the second period), the multiplexer 250 selects to transmit the fingerprint signals Sf of the fingerprint sensor 120 to the input terminals of the AFE circuit 260 through the output terminals of the multiplexer 250.

Based on a design requirement, the AFE circuit 260 may include multiplexers, amplifiers, current-to-voltage circuits, voltage-to-current circuits, integrators and/or filters. For example, the AFE circuit 260 may be a conventional AFE circuit and thus, will not be repeatedly described. The AFE circuit 260 may pre-process the outputs of the multiplexer 250 (which refers to the touch signals St or the fingerprint signals Sf) in analog domain and transmit the pre-processed signals to the input terminals of the ADC 270.

The input terminals of the ADC 270 are coupled to the output terminals of the AFE circuit 260. The ADC 270 may convert the analog signals (or the processed signal) outputted by the AFE circuit 260 into digital signals. The ADC 270 receives the touch signals through the AFE circuit 260 and converts the touch signals into first digital data. The ADC 270 also receives the fingerprint signals through the AFE circuit 260 and converts the fingerprint signals into second digital data.

The input terminals of the data processing circuit 280 are coupled to output terminals of the ADC 270 to receive the first digital data and the second digital data. In some embodiments, the data processing circuit 280 may provide the first digital data and the second digital data to the system processor 140 outside or inside the touch detection IC 130, for example, through an interface (e.g., a GPIO). In some other embodiments, the data processing circuit 280 may perform digital signal processing on the first digital data and the second digital data to calculate respective sensing results.

In the present embodiment, the data processing circuit 280 may process the first digital data by executing an algorithm to acquire a position (coordinate) and/or a moving speed of a touch event on the touch panel 110. The data processing circuit 280 may also process the second digital data to acquire a fingerprint frame. In some embodiments, the data processing circuit 280 may transmit the fingerprint frame to the system processor 140 through the interface (e.g., the GPIO). Then, the system processor 140 may process the fingerprint frame by executing an algorithm, such that a plurality of fingerprint features may be further captured from the fingerprint frame, and identity information of a user may be determined according to the fingerprint features. In some other embodiments, the data processing circuit 280 may further capture a plurality of fingerprint features from the fingerprint frame and transmit the fingerprint features to the system processor 140 through the interface (e.g., the GPIO).

Figure 3:
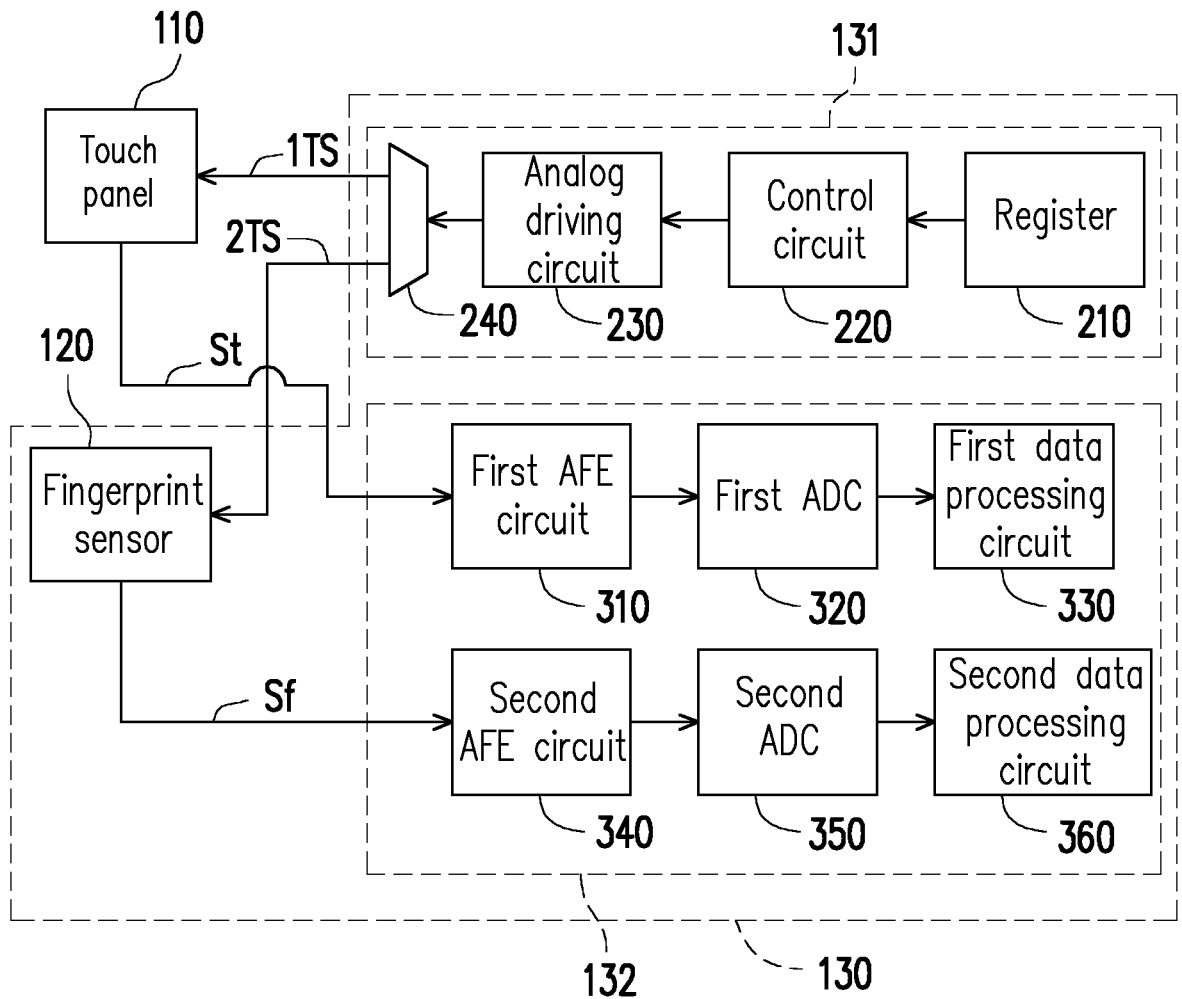
FIG. 3 is a schematic circuit block diagram illustrating the receiving circuit depicted in FIG. 1 according to another embodiment of the invention.

FIG. 3 is a schematic circuit block diagram illustrating the receiving circuit 132 depicted in FIG. 1 according to another embodiment of the invention. The touch panel 110, the fingerprint sensor 120 and the driving signal generation circuit 131 illustrated in FIG. 3 may be derived with reference to the description related to the embodiments illustrated in FIG. 2. In the embodiment illustrated in FIG. 3, the receiving circuit 132 includes a first AFE circuit 310, a first ADC 320, a first data processing circuit 330, a second AFE circuit 340, a second ADC 350 and a second data processing circuit 360. The first AFE circuit 310 and the second AFE circuit 340 illustrated in FIG. 3 may be derived with reference to the description related to the AFE circuit 260 illustrated in FIG. 2 and thus, will not be repeatedly described.

The first input terminals of the first AFE circuit 310 are coupled to the sensing electrodes of the touch panel 110 to receive the touch signals St. The output terminals of the first AFE circuit 310 are coupled to the input terminals of the first ADC 320. The first AFE circuit 310 may pre-process the touch signals St of the touch panel 110 in the analog domain and then, transmit the pre-processed signals to the input terminals of the first ADC 320. The first ADC 320 may receive the pre-processed touch signals through the first AFE circuit 310 and convert the analog signals (i.e., touch signals) outputs by the first AFE circuit 310 into the first digital data. The output terminals of the first ADC 320 are coupled to the input terminals of the first data processing circuit 330 to receive the first digital data. In some embodiments, the first data processing circuit 330 may provide the first digital data to the system processor 140 outside or inside the touch detection IC 130 through the interface (e.g., a GPIO). In some other embodiments, the first data processing circuit 330 may perform digital signal processing on the first digital data to calculate a sensing value of each pixel, so as to acquire a position of a touch event on the touch panel 110.

The input terminals of the second AFE circuit 340 are coupled to the sensing electrodes of the fingerprint sensor 120 to receive the fingerprint signals Sf. The output terminals of the second AFE circuit 340 are coupled to the input terminals of the second ADC 350. The second AFE circuit 340 may pre-process the fingerprint signals Sf of the fingerprint sensor 120 in the analog domain and then, transmit the pre-processed signals to the input terminals of the second ADC 350. The second ADC 350 may receive the pre-processed fingerprint signals through the second AFE circuit 340 and convert the analog signals (i.e., a fingerprint signals) output by the second AFE circuit 340 into the second digital data. The output terminals of the second ADC 350 are coupled to the input terminals of the second data processing circuit 360 to receive the second digital data. In some embodiments, the second data processing circuit 360 may provide the second digital data to the system processor 140 outside or inside the touch detection IC 130 through the interface (e.g., the GPIO). In some other embodiments, the second data processing circuit 360 may perform digital signal processing on the second digital data to calculate a sensing value of each pixel of the fingerprint sensor 120 to obtain a fingerprint frame. The second data processing circuit 360 may transmit the fingerprint frame to the system processor 140 through the interface (e.g., the GPIO). Then, the system processor 140 may process the fingerprint frame by executing an algorithm, such that a plurality of fingerprint features are captured from the fingerprint frame, and identity information of the user may be determined according to the fingerprint features.

Figure 4:
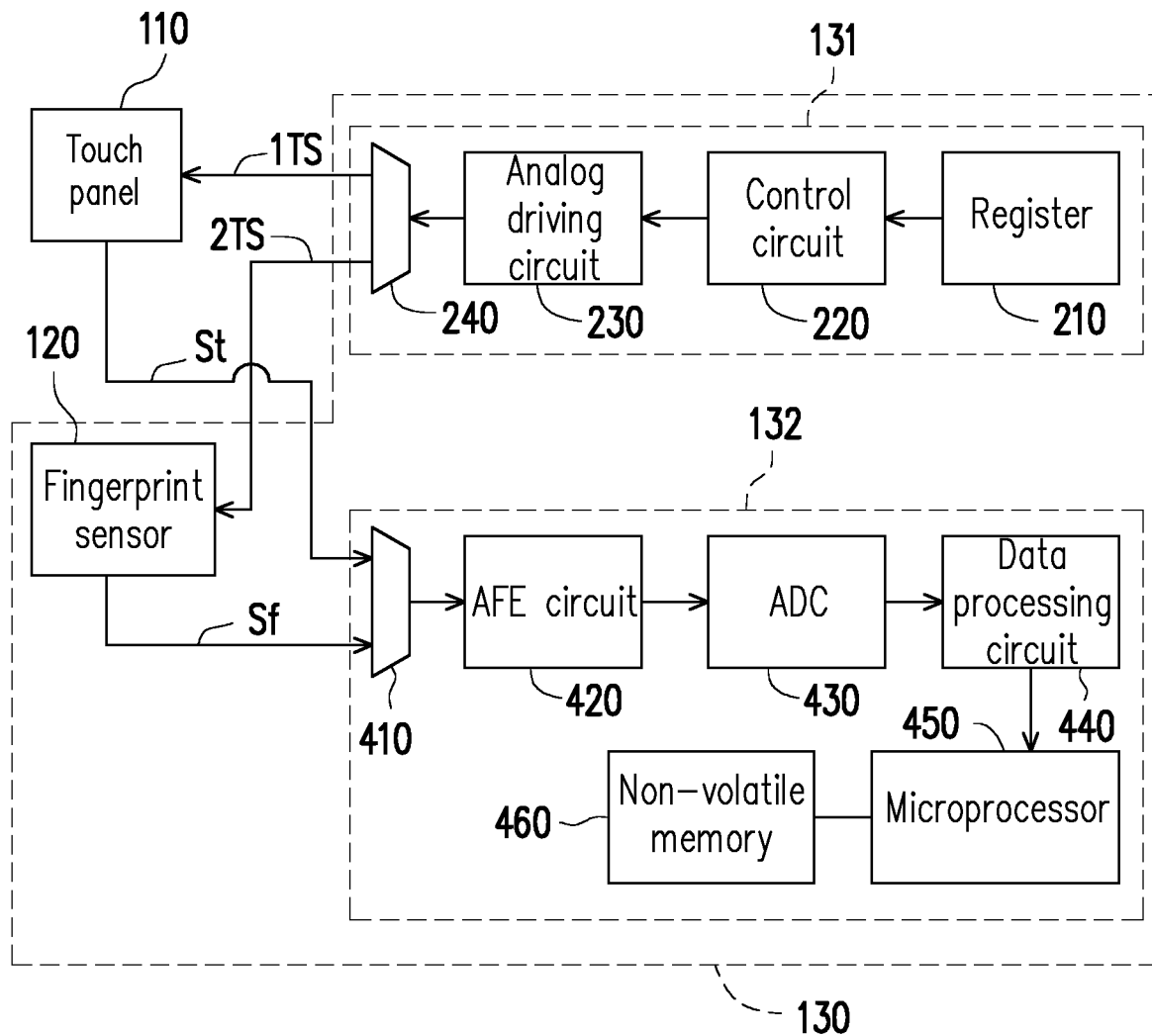
FIG. 4 is a schematic circuit block diagram illustrating the receiving circuit depicted in FIG. 1 according to yet another embodiment of the invention.

FIG. 4 is a schematic circuit block diagram illustrating the receiving circuit 132 depicted in FIG. 1 according to yet another embodiment of the invention. In the embodiment illustrated in FIG. 4, the driving signal generation circuit 131 includes a register 210, a control circuit 220, an analog driving circuit 230 and a demultiplexer 240. The touch panel 110, the fingerprint sensor 120, the driving signal generation circuit 131, the register 210, the control circuit 220, the analog driving circuit 230 and the demultiplexer 240 may be derived with reference to the description related to the embodiment illustrated in FIG. 2 and thus, will not be repeatedly described.

The receiving circuit 132 illustrated in FIG. 4 includes a multiplexer 410, an AFE circuit 420, an ADC 430, a data processing circuit 440, a microprocessor 450 and a non-volatile memory 460. The multiplexer 410, the AFE circuit 420, the ADC 430 and the data processing circuit 440 illustrated in FIG. 4 may be derived with reference to the description related to the multiplexer 250, the AFE circuit 260, the ADC 270 and the data processing circuit 280 illustrated in FIG. 2. The ADC 430 may receive the touch signals St of the touch panel 110 through the multiplexer 410 and the AFE circuit 420 and convert the pre-processed touch signals into the first digital data. The ADC 430 may also receive the fingerprint signals Sf of the fingerprint sensor 120 through the multiplexer 410 and the AFE circuit 420 and convert the pre-processed fingerprint signals into the second digital data. The input terminals of the data processing circuit 440 are coupled to the output terminals of the ADC 430 to receive the first digital data and the second digital data. The first data processing circuit 440 may perform digital signal processing on the first digital data to calculate a sensing value of each pixel of the touch panel 110 for obtaining a first processed digital data. The first data processing circuit 440 may also perform digital signal processing on the second digital data to calculate a sensing value of each pixel of the fingerprint sensor 120.

In other embodiment, the data processing circuit 440 may process the first digital data by executing an algorithm to acquire a position (coordinate) and/or a moving speed of a touch event on the touch panel 110. The data processing circuit 440 may transmit the position (and/or the moving speed) of the touch event on the touch panel 110 to the system processor 140 through an interface (e.g., a GPIO). In the embodiment illustrated in FIG. 4, the data processing circuit 440 may process the first digital data to obtain the first processed digital data. An input terminal of the microprocessor 450 is coupled to the output terminal of the data processing circuit 440 to receive the first processed digital data to acquire a position (coordinate) and/or a moving speed of a touch event on the touch panel 110. The data processing circuit 440 may also process the second digital data to acquire a fingerprint frame. The input terminal of the microprocessor 450 is coupled to an output terminal of the data processing circuit 440 to receive the fingerprint frame.

The non-volatile memory 460 stores the algorithm code (i.e., a software code or a firmware code) used for touch calculation and/or fingerprint recognition. The microprocessor 450 is also coupled to the non-volatile memory 460 to read and execute the algorithm code. Or the code in the non-volatile memory 460 will be loaded to a faster memory (not shown in FIG. 4) that operates with the microprocessor 450. Based on computation of the algorithm code of touch calculation, the microprocessor 450 may acquire the touch position (coordinate) and/or a moving speed of a touch event on the touch panel 110. Based on computation of the algorithm code of fingerprint recognition, the microprocessor 450 may capture a plurality of fingerprint features from the fingerprint frame. Thereby, the microprocessor 450 may recognize the fingerprint frame to generate a fingerprint recognition result. The microprocessor 450 may transmit the fingerprint recognition result to the system processor 140 through an interface (e.g., a GPIO).

Figure 5:
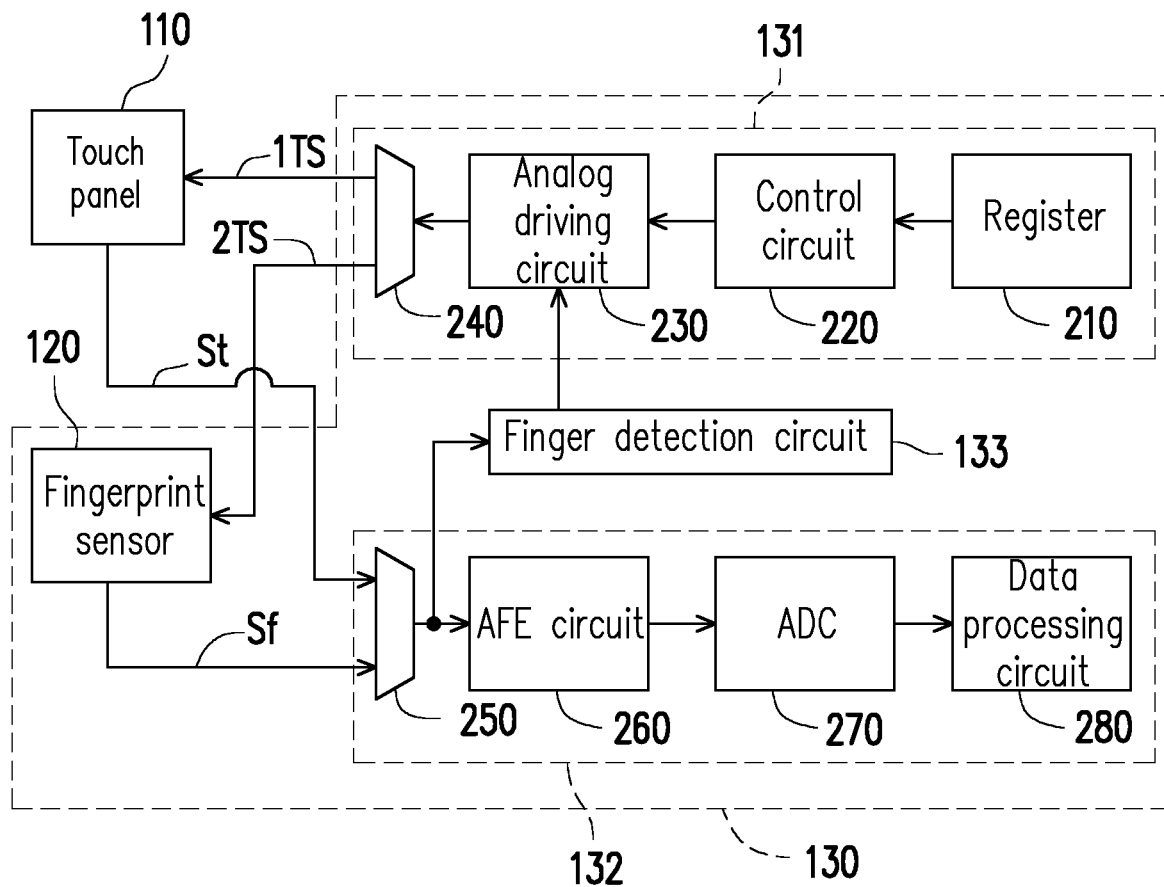
FIG. 5 is a schematic circuit block diagram illustrating the touch detection integrated circuit (IC) depicted in FIG. 1 according to still another embodiment of the invention.

FIG. 5 is a schematic circuit block diagram illustrating the touch detection IC 130 depicted in FIG. 1 according to still another embodiment of the invention. The touch detection IC 130 illustrated in FIG. 5 includes a driving signal generation circuit 131, a receiving circuit 132 and a finger detection circuit 133. The touch panel 110, the fingerprint sensor 120, the driving signal generation circuit 131 and the receiving circuit 132 illustrated in FIG. 5 may be derived with reference to the description related to the embodiments illustrated in FIG. 2 and thus, will not be repeatedly described. In the embodiment illustrated in FIG. 5, the finger detection circuit 133 is coupled to the analog driving circuit 230 of the driving signal generation circuit 131 and the multiplexer 250 of the receiving circuit 132. The finger detection circuit 133 is configured to monitor whether a finger touch event occurs to the touch panel 110, so to determine whether to enable the driving signal generation circuit 131 to output the first driving signals 1TS. In other words, when no finger touch event occurs to the touch panel 110, the driving signal generation circuit 131 may not have to output the first driving signals 1TS and so saves power consumption. Otherwise, when a finger touch event occurs to the touch panel 110, the analog driving circuit 131 may instantly transmit the first driving signals 1TS to the driving electrode of the touch panel 110.

The finger detection circuit 133 may also monitor whether the fingerprint sensor 120 is touched, so to determine whether to enable the driving signal generation circuit 131 to output the second driving signals 2TS. In other words, when the fingerprint sensor 120 is not touched by the finger, the driving signal generation circuit 131 may not have to output the second driving signals 2TS and so saves power consumption. Otherwise, when the fingerprint sensor 120 is touched by the finger, the analog driving circuit 131 may instantly transmit the second driving signals 2TS to the driving electrode of the fingerprint sensor 120.

It is noted that the receiving circuits 132 in the embodiment of FIG. 2 and FIG. 3 can be combined in different manners, as will be exemplarily illustrated as different embodiments below. The receiving circuit can be configured to receive and process the touch signal of the touch panel during a first period, and receive and process the fingerprint signal of the fingerprint sensor during a second period. The receiving circuit may include a multiplexer, having a first input terminal coupled to the touch panel and a second input terminal coupled to the fingerprint sensor, configured to select to transmit one of the touch signal and the fingerprint signal to a same output terminal of the multiplexer and an analog signal processing circuit. The analog signal processing circuit can have an input terminal coupled to the same output terminal of the multiplexer to receive the one of the touch signal and the fingerprint signal transmitted from the same output terminal of the multiplexer, configured to generate a processed signal according to the one of the touch signal and the fingerprint signal transmitted from the same output terminal of the multiplexer.

Figure 6:
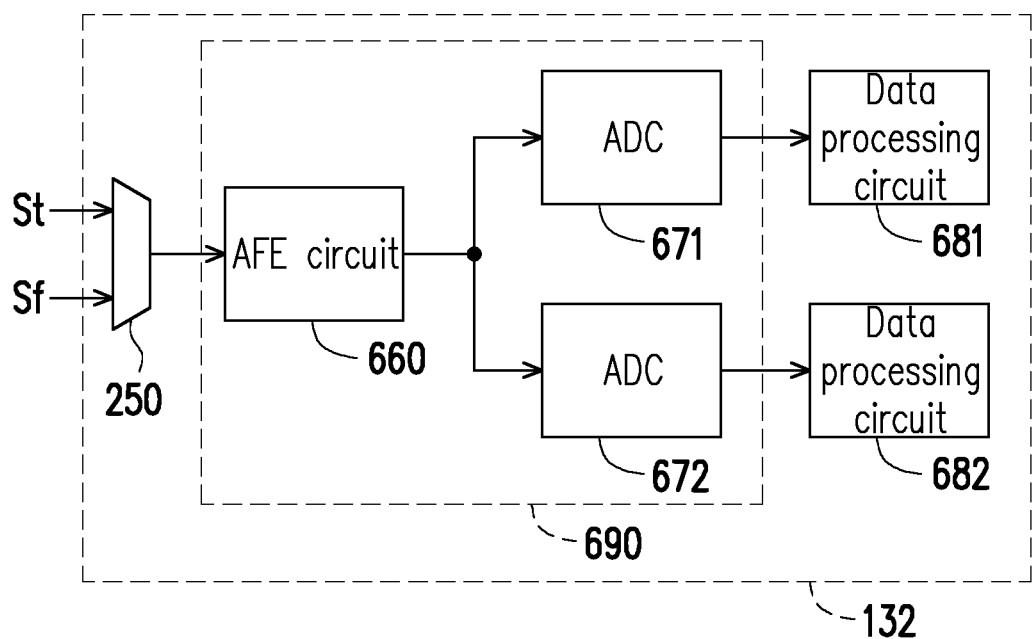
FIG. 6 is a schematic circuit block diagram illustrating the receiving circuit depicted in FIG. 1 according to another embodiment of the invention.

FIG. 6 is a schematic circuit block diagram illustrating the receiving circuit 132 depicted in FIG. 1 according to another embodiment of the invention. In the embodiment illustrated in FIG. 6, the receiving circuit 132 includes a multiplexer 250, an analog signal processing circuit 690, a data processing circuit 681 and a data processing circuit 682. The first input terminal of the multiplexer 250 is coupled to the touch panel 110. The second input terminal of the multiplexer 250 is coupled to the fingerprint sensor 120. The multiplexer 250 selects to transmit one of the touch signal St and the fingerprint signal Sf to the same output terminal of the multiplexer 250. The multiplexer 250 and the analog signal processing circuit 690 illustrated in FIG. 6 may be derived with reference to the description related to the multiplexer 250 and the analog signal processing circuit 290 illustrated in FIG. 2, and the data processing circuit 681 and the data processing circuit 682 illustrated in FIG. 6 may be derived with reference to the description related to the data processing circuit 280 illustrated in FIG. 2.

In the embodiment illustrated in FIG. 6, the analog signal processing circuit 690 includes an AFE circuit 660, an ADC 671 and an ADC 672. The input terminal of the AFE circuit 660 is coupled to the same output terminal of the multiplexer 250. The AFE circuit 660 receives one of the touch signal St and the fingerprint signal Sf transmitted from the same output terminal of the multiplexer 250. The AFE circuit 660 generates the processed signal according to the one of the touch signal St and the fingerprint signal Sf transmitted from the same output terminal of the multiplexer 250. The output terminal of the AFE circuit 660 provides the processed signal to the ADC 671 and ADC 672. The AFE circuit 660 illustrated in FIG. 6 may be derived with reference to the description related to the AFE circuit 260 illustrated in FIG. 2.

The input terminal of the ADC 671 is coupled to the output terminal of the AFE circuit 660. The ADC 671 generates first digital data according to the processed signal transmitted from the AFE circuit 260 when the processed signal is generated according to the touch signal St. The output terminal of the ADC 671 provides the first digital data to the data processing circuit 681. The input terminal of the ADC 672 is coupled to the output terminal of the AFE circuit 260. The ADC 672 generates second digital data according to the processed signal transmitted from the AFE circuit 260 when the processed signal is generated according to the fingerprint signal Sf. The output terminal of the ADC 672 provides the second digital data to the data processing circuit 682.

Figure 7:
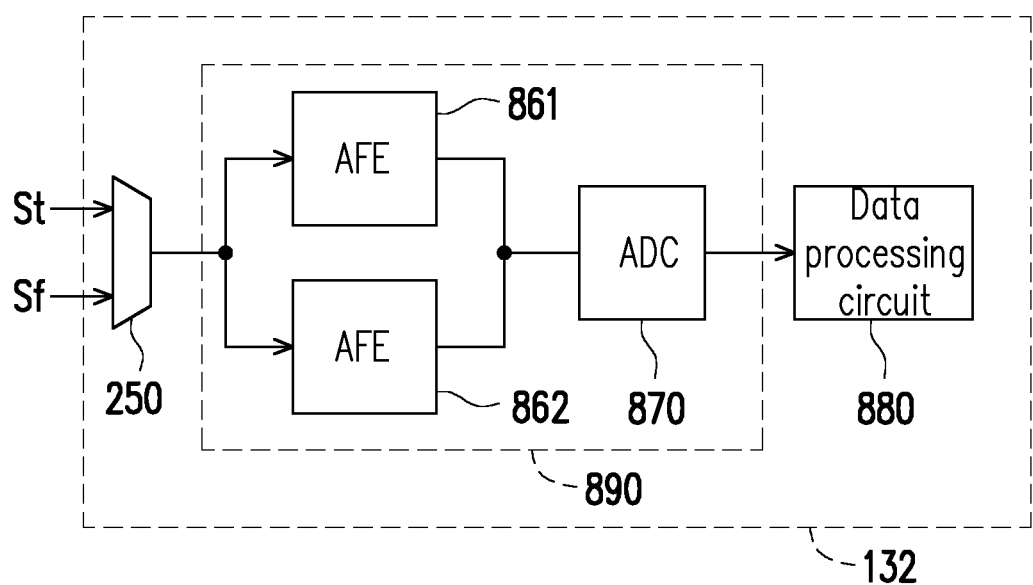
FIG. 7 is a schematic circuit block diagram illustrating the receiving circuit depicted in FIG. 1 according to another embodiment of the invention.

FIG. 7 is a schematic circuit block diagram illustrating the receiving circuit 132 depicted in FIG. 1 according to another embodiment of the invention. In the embodiment illustrated in FIG. 7, the receiving circuit 132 includes a multiplexer 250, an analog signal processing circuit 890, and a data processing circuit 880. The multiplexer 250 illustrated in FIG. 7 may be derived with reference to the description related to the multiplexer 250 illustrated in FIG. 6, and the analog signal processing circuit 890 and the data processing circuit 880 illustrated in FIG. 7 may be derived with reference to the description related to the analog signal processing circuit 290 and the data processing circuit 280 illustrated in FIG. 2.

In the embodiment illustrated in FIG. 7, the analog signal processing circuit 890 includes an AFE 861, an AFE 862 and an ADC 870. The input terminal of the AFE 861 is coupled to the same output terminal of the multiplexer 250. The AFE 861 generates first analog signal according to the touch signal St transmitted from the same output terminal of the multiplexer 250. The output terminal of the AFE 861 provides the first analog signal to the ADC 870. The input terminal of the AFE 862 is coupled to the same output terminal of the multiplexer 250. The AFE 862 generates second analog signal according to the fingerprint signal Sf transmitted from the same output terminal of the multiplexer 250. The output terminal of the AFE 862 provides the second analog signal to the ADC 870.

The input terminal of the ADC 870 is coupled to the output terminal of the AFE 861 and the AFE 862. The ADC 870 generates digital data according to the first analog signal transmitted from the AFE 861 and the second analog signal transmitted from the AFE 862. The input terminal of the data processing circuit 880 is coupled to the output terminal of the analog signal processing circuit 890 to receive the digital data.

In addition, the invention is not limited to the above embodiments. One or more of the AFE, the ADC and the data processing circuit can be shared for performing the touch sensing operation and the fingerprint sensing operation.

Figure 8:
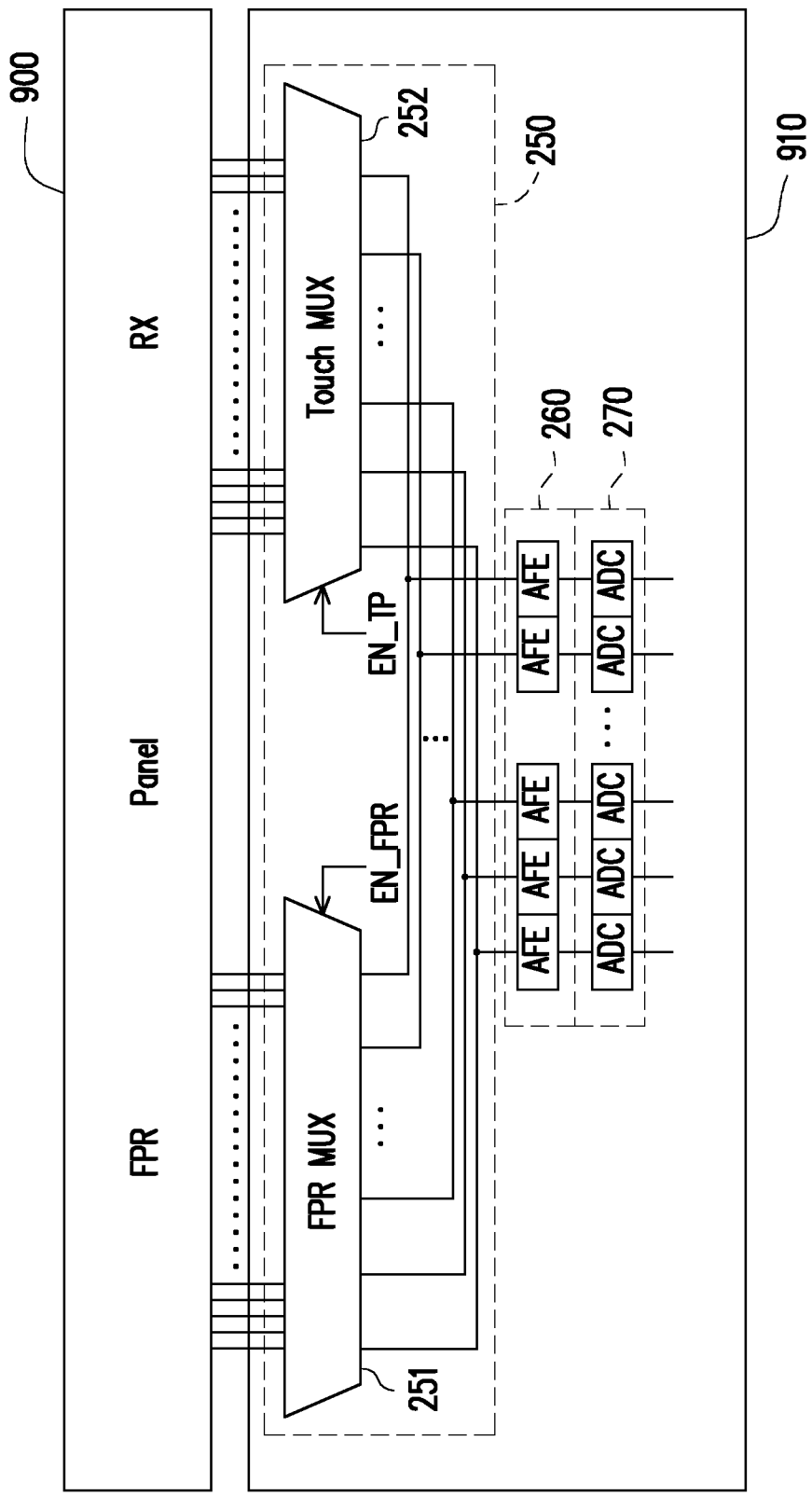
FIG. 8 is a schematic circuit block diagram illustrating the multiplexer, the AFE circuit, and the ADC depicted in FIG. 2 according to an embodiment of the invention.

FIG. 8 is a schematic circuit block diagram illustrating the multiplexer 250, the AFE circuit 260, and the ADC 270 depicted in FIG. 2 according to an embodiment of the invention. In the embodiment illustrated in FIG. 8, the touch panel 110 is a touch display panel 900, and the fingerprint sensor 120 is embedded in the touch display panel 900. In the embodiment illustrated in FIG. 8, the multiplexer 250 includes a multiplexer 251 and a multiplexer 252 which can be separated or integrated. A plurality of input terminals of the multiplexer 252 is coupled to a plurality of touch sensing lines RX of the touch panel 110 (the touch display panel 900). The multiplexer 252 select to transmit the touch signal St from one of the touch sensing lines RX to the same output terminal of the multiplexer 250 according to a touch enable signal EN_TP. A plurality of input terminals of the multiplexer 251 is coupled to a plurality of fingerprint sensing lines FPR of the fingerprint sensor 120 (the touch display panel 900). The multiplexer 251 select to transmit the fingerprint signal Sf from one of the fingerprint sensing lines FPR to the same output terminal of the multiplexer 250 according to a fingerprint enable signal EN_FPR.

Figure 9:
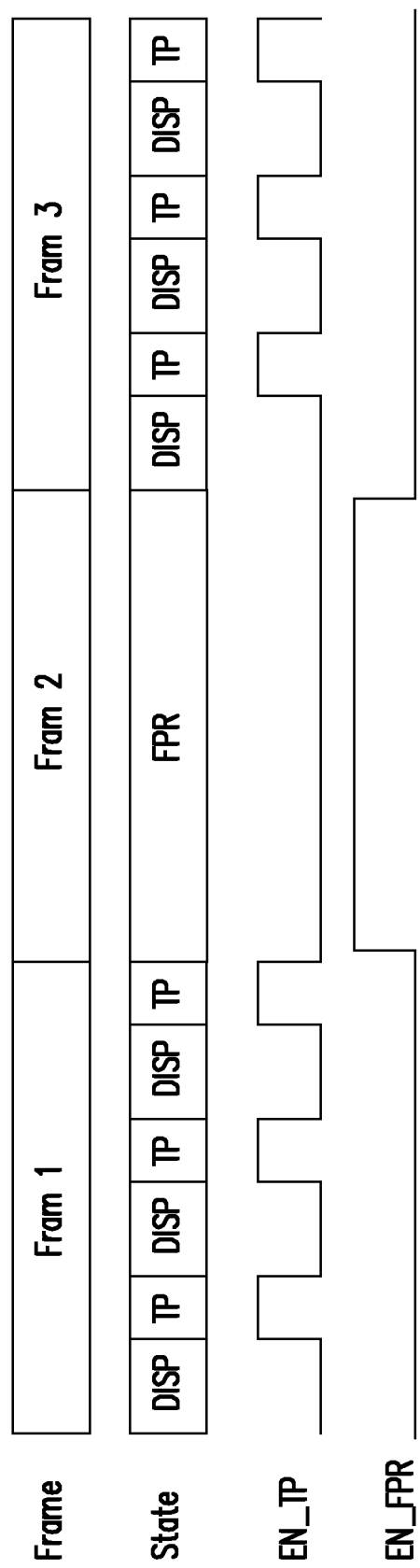
FIG. 9 is timing diagram of the circuit shown in FIG. 8 according to an embodiment of the invention.

FIG. 9 is timing diagram of the circuit shown in FIG. 8 according to an embodiment of the invention. Please refer to FIG. 8 and FIG. 9. During the display frame period Frame1, the integrated circuit 910 can intersperse the touch detection operation TP between the display driving operations DISP. For example, assume that the AFE circuit 260 and the ADC 270 shown in FIG. 9 have 216 channels, and the touch display panel 900 has 648 touch sensing lines RX. Therefore, the multiplexer 252 sends 216 of the 648 touch sensing lines RX to the AFE circuit 260 each time. That is, the multiplexer 252 can send signals of the 648 touch sensing lines RX to the AFE circuit 260 in three (648/216=3) intervals during one display frame. The operation of the integrated circuit 910 during the display frame period Frame3 can refer to the related description of the display frame period Frame1, and therefore will not be described.

Next, assuming that the touch display panel 900 has a fingerprint identification requirement during the display frame period Frame2, the integrated circuit 910 can stop the display driving operation DISP and the touch detection operation TP during the display frame period Frame2. For example, assume that the touch display panel 900 shown in FIG. 8 has 1,050 fingerprint sensing lines FPR. Therefore, during the display frame period Frame2, the multiplexer 251 sends signals of 216 fingerprint sensing lines FPR among the 1,050 fingerprint sensing lines FPR to the AFE circuit 260 each time. It is noted that FIG. 9 only shows an example and a diverse of different timing arrangement can be implemented according to design requirements.

In the above embodiments, the functions described in the invention can be implemented by hardware, software and firmware. The register described above may be a memory card, a flash memory or any other memory apparatus. In terms of the hardware or software implementation, various exemplary logics, logical blocks, modules and circuits of the processing unit may be implemented or executed in combination with the aspects illustrated in the embodiments of the invention in the electronic devices (e.g., ASIC, DSP, DSPD, FPGA, transistor logics, amplifiers, comparators, controllers, micro-controllers, microprocessors) which are designed for performing the functions described herein.

Based on the above, the touch detection IC provided by the embodiments of the invention can be applied to the touch panel and the fingerprint sensor. The touch panel and the fingerprint sensor can share the same set of the driving signal generation circuit and the receiving circuit. Thus, the touch detection IC can effectively save system cost of the touch apparatus.

Although the invention has been disclosed by the above embodiments, they are not intended to limit the invention. It will be apparent to one of ordinary skill in the art that modifications and variations to the invention may be made without departing from the spirit and scope of the invention. Therefore, the scope of the invention will be defined by the appended claims.

What is claimed is:

1. A touch detection integrated circuit, configured to drive a touch panel to receive at least one touch signal of the touch panel and drive a fingerprint sensor to receive at least one fingerprint signal of the fingerprint sensor, the touch detection integrated circuit comprising:
 a driving signal generation circuit, configured to control the touch panel to perform touch sensing operation and control the fingerprint sensor to perform fingerprint sensing operation; and
 at least one receiving circuit, configured to receive and process the touch signal of the touch panel during a first period, and receive and process the fingerprint signal of the fingerprint sensor during a second period, wherein the receiving circuit comprises:
  a multiplexer, having a first input terminal coupled to the touch panel and a second input terminal coupled to the fingerprint sensor, configured to select to transmit one of the touch signal and the fingerprint signal to an output terminal of the multiplexer;
  an analog front-end (AFE) circuit, having an input terminal coupled to the output terminal of the multiplexer; and
  an analog-to-digital converter (ADC), having an input terminal coupled to an output terminal of the AFE circuit, wherein the ADC receives the touch signal through the AFE circuit and converts the touch signal into digital data during the first period of selecting to transmit the touch signal to the output terminal of the multiplexer by the multiplexer, and the ADC receives the fingerprint signal through the AFE circuit and converts the fingerprint signal into digital data during the second period of selecting to transmit the fingerprint signal to the output terminal of the multiplexer by the multiplexer.

2. The touch detection integrated circuit according to claim 1, wherein the driving signal generation circuit is configured to transmit at least one first driving signal for controlling the touch panel to perform touch sensing operation during the first period, and transmit at least one second driving signal for controlling the fingerprint sensor to perform fingerprint sensing operation during the second period.

3. The touch detection integrated circuit according to claim 2, wherein the driving signal generation circuit comprises:
 an analog driving circuit, having an input terminal and an output terminal; and
 a demultiplexer, having an input terminal coupled to the output terminal of the analog driving circuit, a first output terminal coupled to the touch panel and a second output terminal coupled to the fingerprint sensor, selecting to transmit the first driving signal generated by the analog driving circuit to the touch panel during a first period and selecting to transmit the second driving signal generated by the analog driving circuit to the fingerprint sensor during a second period.

4. The touch detection integrated circuit according to claim 3, wherein the driving signal generation circuit further comprises:
 a register, configured to store first driving waveform data and second driving waveform data; and
 a control circuit, having an input terminal coupled to the register to read the first driving waveform data or the second driving waveform data stored in the register and an output terminal coupled to the input terminal of the analog driving circuit, controlling the analog driving circuit according to the first driving waveform data to generate the first driving signal, and controlling the analog driving circuit according to the second driving waveform data to generate the second driving signal.

5. The touch detection integrated circuit according to claim 1, wherein the receiving circuit further comprises:
 a data processing circuit, having an input terminal coupled to an output terminal of the ADC to receive the first digital data and the second digital data.

6. The touch detection integrated circuit according to claim 5, wherein the data processing circuit processes the first digital data to acquire a position of a touch event on the touch panel and processes the second digital data to obtain a fingerprint frame.

7. The touch detection integrated circuit according to claim 6, wherein the data processing circuit further captures a plurality of fingerprint features from the fingerprint frame.

8. The touch detection integrated circuit according to claim 5, wherein the data processing circuit provides the first digital data and the second digital data to a system processor.

9. The touch detection integrated circuit according to claim 1, wherein the receiving circuit further comprises:
 a data processing circuit, having an input terminal coupled to an output terminal of the ADC to receive the first digital data and the second digital data, processing the first digital data to obtain a first processed digital data, and processing the second digital data to obtain a fingerprint frame.

10. The touch detection integrated circuit according to claim 9, wherein the receiving circuit further comprises:
 a microprocessor, having an input terminal coupled to an output terminal of the data processing circuit to receive the first processed digital data to acquire a position of a touch event on the touch panel, or to receive the fingerprint frame, and configured to recognize the fingerprint frame to generate a fingerprint recognition result.

11. The touch detection integrated circuit according to claim 1, further comprising:
a finger detection circuit, coupled to the driving signal generation circuit and the receiving circuit and configured to monitor whether a finger touch event occurs to the touch panel, so as to determine whether to enable the driving signal generation circuit to output at least one first driving signal for controlling the touch panel to perform touch sensing operation during the first period, and monitor whether the fingerprint sensor is touched, so as to determine whether to enable the driving signal generation circuit to output at least one second driving signal for controlling the fingerprint sensor to perform fingerprint sensing operation during the second period.

12. The touch detection integrated circuit according to claim 1, wherein the touch detection integrated circuit and the fingerprint sensor are disposed in the same package.

13. The touch detection integrated circuit according to claim 1, wherein the touch panel is a touch display panel, and the fingerprint sensor is embedded in the touch display panel.

14. A touch apparatus, comprising:
a system processor;
a touch panel;
a fingerprint sensor;
a touch detection integrated circuit, coupled to the touch panel, coupled to the system processor through an interface, and configured to drive the touch panel to receive at least one touch signal of the touch panel and drive the fingerprint sensor to receive at least one fingerprint signal of the fingerprint sensor, wherein the touch detection integrated circuit comprises:
a driving signal generation circuit, configured to control the touch panel to perform touch sensing operation and control the fingerprint sensor to perform fingerprint sensing operation; and
at least one receiving circuit, configured to receive and process the touch signal of the touch panel during a first period, and receive and process the fingerprint signal of the fingerprint sensor during a second period, wherein the receiving circuit comprises:
a multiplexer, having a first input terminal coupled to the touch panel and a second input terminal coupled to the fingerprint sensor, configured to select to transmit one of the touch signal and the fingerprint signal to an output terminal of the multiplexer;
an analog front-end (AFE) circuit, having an input terminal coupled to the output terminal of the multiplexer; and
an analog-to-digital converter (ADC), having an input terminal coupled to an output terminal of the AFE circuit, wherein the ADC receives the touch signal through the AFE circuit and converts the touch signal into digital data during the first period of selecting to transmit the touch signal to the output terminal of the multiplexer by the multiplexer, and the ADC receives the fingerprint signal through the AFE circuit and converts the fingerprint signal into digital data during the second period of selecting to transmit the fingerprint signal to the output terminal of the multiplexer by the multiplexer.

15. The touch apparatus according to claim 14, wherein the driving signal generation circuit is configured to transmit at least one first driving signal for controlling the touch panel to perform touch sensing operation during the first period, and transmit at least one second driving signal for controlling the fingerprint sensor to perform fingerprint sensing operation during the second period.

16. The touch apparatus according to claim 15, wherein the driving signal generation circuit comprises:
an analog driving circuit, having an input terminal and an output terminal; and
a demultiplexer, having an input terminal coupled to the output terminal of the analog driving circuit, a first output terminal coupled to the touch panel and a second output terminal coupled to the fingerprint sensor, selecting to transmit the first driving signal generated by the analog driving circuit to the touch panel during a first period and selecting to transmit the second driving signal generated by the analog driving circuit to the fingerprint sensor during a second period.

17. The touch apparatus according to claim 16, wherein the driving signal generation circuit further comprises:
a register, configured to store first driving waveform data and second driving waveform data; and
a control circuit, having an input terminal coupled to the register to read the first driving waveform data or the second driving waveform data stored in the register and an output terminal coupled to the input terminal of the analog driving circuit, controlling the analog driving circuit according to the first driving waveform data to generate the first driving signal, and controlling the analog driving circuit according to the second driving waveform data to generate the second driving signal.

18. The touch apparatus according to claim 14, wherein the receiving circuit further comprises:
a data processing circuit, having an input terminal coupled to an output terminal of the ADC to receive the first digital data and the second digital data.

19. The touch apparatus according to claim 18, wherein the data processing circuit processes the first digital data to acquire a position of a touch event on the touch panel and processes the second digital data to obtain a fingerprint frame.

20. The touch apparatus according to claim 19, wherein the data processing circuit further captures a plurality of fingerprint features from the fingerprint frame.

21. The touch apparatus according to claim 18, wherein the data processing circuit provides the first digital data and the second digital data to the system processor.

22. The touch apparatus according to claim 14, wherein the receiving circuit further comprises:
a data processing circuit, having an input terminal coupled to an output terminal of the ADC to receive the first digital data and the second digital data, processing the first digital data to obtain a first processed digital data, and processing the second digital data to obtain a fingerprint frame.

23. The touch apparatus according to claim 22, wherein the receiving circuit further comprises:
a microprocessor, having an input terminal coupled to an output terminal of the data processing circuit to receive the first processed digital data to acquire a position of a touch event on the touch panel, or to receive the fingerprint frame and configured to recognize the fingerprint frame to generate a fingerprint recognition result.

24. The touch apparatus according to claim 14, wherein the touch detection integrated circuit further comprises:
  a finger detection circuit, coupled to the driving signal generation circuit and the receiving circuit and configured to monitor whether a finger touch event occurs to the touch panel, so as to determine whether to enable the driving signal generation circuit to output at least one first driving signal for controlling the touch panel to perform touch sensing operation during the first period, and monitor whether the fingerprint sensor is touched, so as to determine whether to enable the driving signal generation circuit to output at least one second driving signal for controlling the fingerprint sensor to perform fingerprint sensing operation during the second period.

25. The touch apparatus according to claim 14, wherein the touch detection integrated circuit and the fingerprint sensor are disposed in the same package.

26. The touch apparatus according to claim 14, wherein the touch detection integrated circuit is disposed on a flexible circuit board and electrically connected to the touch panel through the flexible circuit board.

27. The touch apparatus according to claim 14, wherein the touch panel is a touch display panel, and the fingerprint sensor is embedded in the touch display panel.

28. An integrated circuit, configured to drive a touch panel to receive at least one touch signal of the touch panel and drive a fingerprint sensor to receive at least one fingerprint signal of the fingerprint sensor, the integrated circuit comprising:
  a driving signal generation circuit, configured to control the touch panel to perform touch sensing operation and control the fingerprint sensor to perform fingerprint sensing operation; and
  at least one receiving circuit, configured to receive and process the touch signal of the touch panel during a first period, and receive and process the fingerprint signal of the fingerprint sensor during a second period, wherein the receiving circuit comprises:
    a multiplexer, having a first input terminal coupled to the touch panel and a second input terminal coupled to the fingerprint sensor, configured to select to transmit one of the touch signal and the fingerprint signal to a same output terminal of the multiplexer; and
    an analog signal processing circuit, having an input terminal coupled to the same output terminal of the multiplexer to receive the one of the touch signal and the fingerprint signal transmitted from the same output terminal of the multiplexer, configured to generate a processed signal according to the one of the touch signal and the fingerprint signal transmitted from the same output terminal of the multiplexer.

29. The integrated circuit according to claim 28, wherein the analog signal processing circuit comprises:
  a same (AFE) circuit, having an input terminal coupled to the same output terminal of the multiplexer, and configured to receive one of the touch signal and the fingerprint signal transmitted from the same output terminal of the multiplexer and generate the processed signal according to the one of the touch signal and the fingerprint signal transmitted from the same output terminal of the multiplexer, and having an output terminal to provide the processed signal.

30. The integrated circuit according to claim 29, wherein the analog signal processing circuit comprises:

a same analog-to-digital converter (ADC), having one input terminal coupled to an output terminal of the AFE circuit, configured to generate digital data according to the processed signal transmitted from the AFE, and having an output terminal to provide the digital data.

31. The integrated circuit according to claim 29, wherein the analog signal processing circuit comprises:
  a first analog-to-digital converter (ADC), having a first input terminal coupled to the output terminal of the AFE circuit, configured to generate first digital data according to the processed signal transmitted from the AFE circuit when the processed signal is generated according to the touch signal; and
  a second ADC, having a second input terminal coupled to the output terminal of the AFE circuit, configured to generate second digital data according to the processed signal transmitted from the AFE circuit when the processed signal is generated according to the fingerprint signal.

32. The integrated circuit according to claim 28, wherein the analog signal processing circuit comprises:
  a same analog-to-digital converter (ADC), having a same input terminal indirectly coupled to the same output terminal of the multiplexer, configured to generate digital data to be served as the processed signal according to the one of the touch signal and the fingerprint signal transmitted from the same output terminal of the multiplexer, and having an output terminal to provide the processed signal.

33. The integrated circuit according to claim 32, wherein the analog signal processing circuit further comprises:
  a same (AFE) circuit, having an input terminal coupled to the same output terminal of the multiplexer, and configured to receive one of the touch signal and the fingerprint signal transmitted from the same output terminal of the multiplexer and generate an analog signal according to the one of the touch signal and the fingerprint signal transmitted from the same output terminal of the multiplexer, and having a same output terminal is coupled to the same input terminal of the same ADC.

34. The integrated circuit according to claim 32, wherein the analog signal processing circuit further comprises:
  a first AFE, having a first input terminal coupled to the same output terminal of the multiplexer, configured to generate first analog signal according to the touch signal transmitted from the same output terminal of the multiplexer; and
  a second AFE, having a second input terminal coupled to the same output terminal of the multiplexer, configured to generate second analog signal according to the fingerprint signal transmitted from the same output terminal of the multiplexer.

35. The integrated circuit according to claim 28, further comprising:
  at least one data processing circuit, having at least tone input terminal coupled to an output terminal of the analog signal processing circuit.

36. The integrated circuit according to claim 28, wherein the multiplexer comprises:
  a first multiplexer, having a plurality of first input terminals coupled to a plurality of touch sensing lines of the touch panel, configured to select to transmit the touch signal from one of the touch sensing lines to the same output terminal of the multiplexer according to a touch enable signal; and a second multiplexer, having a plurality of second input terminals coupled to a plurality of fingerprint sensing lines of the fingerprint sensor, configured to select to transmit the fingerprint signal from one of the fingerprint sensing lines to the same output terminal of the multiplexer according to a fingerprint enable signal.

37. A touch apparatus, comprising:

a touch panel;

a fingerprint sensor;

a driving signal generation circuit, configured to control the touch panel to perform touch sensing operation and control the fingerprint sensor to perform fingerprint sensing operation; and at least one receiving circuit, configured to receive and process a touch signal of the touch panel during a first period, and receive and process a fingerprint signal of the fingerprint sensor during a second period, wherein the receiving circuit comprises:

a multiplexer, having a first input terminal coupled to the touch panel and a second input terminal coupled to the fingerprint sensor, configured to select to transmit one of the touch signal and the fingerprint signal to a same output terminal of the multiplexer; and an analog signal processing circuit, having an input terminal coupled to the same output terminal of the multiplexer to receive the one of the touch signal and the fingerprint signal transmitted from the same output terminal of the multiplexer, configured to generate a processed signal according to the one of the touch signal and the fingerprint signal transmitted from the same output terminal of the multiplexer.

38. The touch apparatus according to claim 37, wherein the touch panel is a touch display pane.

39. The touch apparatus according to claim 38, wherein the fingerprint sensor is arranged as one of an on-display configuration, an-under-display configuration, a local in-display configuration and a global in-display configuration.

* * * * *